(12) United States Patent
Sano et al.

(10) Patent No.: US 7,300,613 B2
(45) Date of Patent: Nov. 27, 2007

(54) PROCESS FOR PRODUCING THREE-DIMENSIONAL MODEL, AND THREE-DIMENSIONAL MODEL

(75) Inventors: Shojiro Sano, Shizuoka (JP); Hidefumi Sera, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 574 days.

(21) Appl. No.: 10/839,229

(22) Filed: May 6, 2004

(65) Prior Publication Data
US 2004/0222549 A1 Nov. 11, 2004

(30) Foreign Application Priority Data
May 9, 2003 (JP) ............................. 2003-131718
Sep. 18, 2003 (JP) ............................. 2003-326414

(51) Int. Cl.
*B29C 31/04* (2006.01)
*B29C 67/00* (2006.01)

(52) U.S. Cl. ..................... 264/113; 264/308
(58) Field of Classification Search ................. 264/113
See application file for complete search history.

(56) References Cited

U.S. PATENT DOCUMENTS

| | | | |
|---|---|---|---|
| 5,204,055 A | 4/1993 | Sachs et al. | |
| 5,387,380 A | 2/1995 | Cima et al. | |
| 6,165,406 A * | 12/2000 | Jang et al. | 264/308 |
| 6,375,874 B1 * | 4/2002 | Russell et al. | 264/28 |
| 6,467,897 B1 * | 10/2002 | Wu et al. | 347/102 |
| 6,547,994 B1 * | 4/2003 | Monkhouse et al. | 264/40.1 |
| 6,989,115 B2 * | 1/2006 | Russell et al. | 264/39 |
| 2002/0079601 A1 * | 6/2002 | Russell et al. | 264/40.1 |
| 2004/0005182 A1 * | 1/2004 | Gaylo et al. | 400/283 |
| 2004/0251574 A1 * | 12/2004 | Collins et al. | 264/113 |
| 2005/0093194 A1 * | 5/2005 | Oriakhi et al. | 264/113 |

FOREIGN PATENT DOCUMENTS

| | | |
|---|---|---|
| JP | 2001-150556 A | 6/2001 |
| JP | 2002-307562 A | 10/2002 |
| WO | WO 98/09798 A1 | 3/1998 |

OTHER PUBLICATIONS

Moon et al, "Fabrication of functionally graded reaction infiltrated SiC-Si composite by three-dimensional printing (3DP) process", Materials Science and Engineering A, vol. 298, Issues 1-2, Jan. 2001, pp. 110-119.*

* cited by examiner

*Primary Examiner*—Mary Lynn Theisen
(74) *Attorney, Agent, or Firm*—Sughrue Mion, PLLC

(57) ABSTRACT

A process for producing a three-dimensional model is provided. The process includes a step (layer formation step) of forming a layer of a powder material, the layer having a predetermined thickness, a step (cross-sectional shape formation step) of imagewise bonding the powder material layer by a binder according to sliced cross-sectional data of a modeled object so as to give a cross-sectional shape, and sequentially repeating the above steps. The surface gloss of the three-dimensional model obtained when measured at 20° is 20% or more. Furthermore, production equipment used in the above process is provided. Moreover, a three-dimensional model is provided that contains a powder material and a binder and is formed by imagewise curing the binder, the three-dimensional model having a surface gloss when measured at 20° of 20% or more.

11 Claims, 3 Drawing Sheets

PROCESS FOR PRODUCING THREE-DIMENSIONAL MODEL, AND THREE-DIMENSIONAL MODEL

BACKGROUND OF THE INVENTION

1. Field of the Invention

The present invention relates to a process for producing a three-dimensional model and production equipment used therefor and, in particular, to a process for producing a three-dimensional model by sequentially layering a plurality of sliced cross-sectional shapes of a three-dimensional model of an object, and production equipment used therefor.

2. Description of the Related Art

There is a conventionally known technique to form a model, which is a three-dimensional model of a solid modeled object, by imagewise bonding with a binder a thin powder layer for each of a plurality of sliced cross-sectional shapes of the modeled object, and sequentially layering these bonded thin cross-sectional shaped layers.

Such a technique is known as rapid prototyping and can be utilized in applications such as component prototyping and design verification. Recently, a system employing an inkjet method, which is inexpensive, fast, and suitable for the formation of a color model, has been proposed and disclosed in, for example, Japanese registered patent No. 2729110. A specific procedure for this three-dimensional modeling is explained below.

Firstly, a thin layer of a powder is spread on a flat surface by means of a blade mechanism so as to have a uniform thickness, and an inkjet nozzle head is made to scan and discharge a binder onto the surface of the thin powder layer according to a cross-sectional shape based on cross-sectional data of the modeled object. The powder material in the region where the binder has been discharged is subjected to an operation necessary to put it into a bonded state and also to bond it to the cross-sectional shape of a lower layer that has already been formed. These steps of sequentially forming a thin powder layer at the top and discharging the binder are repeated until the whole model is completed. Finally, powder in a region to which no binder has been applied can be removed easily when taking out the model from the equipment and the target model can be separated because the powder particles are separate and not bonded to each other. In accordance with the above-mentioned operations, a desired three-dimensional model can be produced.

Furthermore, a production process employing a similar method, in which binders are colored with yellow (Y), magenta (M), and cyan (C), thus giving a colored three-dimensional model, has been disclosed in, for example, JP-A-2001-150556 (JP-A denotes a Japanese unexamined patent application publication).

However, in the present situation the above-mentioned method cannot achieve a satisfactory level of properties (texture, color) for a model when compared with that which is desired. In particular, it is thought that a three-dimensional model for which transparency is required cannot be obtained by the conventional method because of the difference in properties between the powder and the binder. Furthermore, in order to impart high surface gloss and transparency and a smooth colored appearance, it is necessary to carry out overcoating and polishing manually, which requires the time and expense.

Moreover, it is generally difficult to reliably draw a desired pattern, etc. on a predetermined position of a three-dimensional model by hand painting.

Since a three-dimensional model immediately after forming is shaped only by virtue of the bonding force of the binder, the three-dimensional model has a low strength and, depending on the way it is handled, might be broken. Conventionally, therefore, after forming the three-dimensional model it is impregnated with a resin, a wax, etc. between the powder particles in order to increase the strength. However, such a step requires time and effort.

BRIEF SUMMARY OF THE INVENTION

It is an object of the present invention to provide a process for producing a three-dimensional model in a short period of time and at low cost, the three-dimensional model having excellent coloration and strength, high surface gloss and transparency, and a colored appearance, and also to provide production equipment used for this process.

The object of the present invention can be attained by the following means (1) to (3).

(1) A process for producing a three-dimensional model, the process comprising a step (layer formation step) of forming above a support a layer of a powder material, the layer having a predetermined thickness, a step (cross-sectional shape formation step) of imagewise bonding the powder material layer by a binder according to the cross-sectional shape of a modeled object, and sequentially repeating the above steps, the surface gloss of the three-dimensional model obtained when measured at 20° being 20% or more, (2) equipment for producing a three-dimensional model, the equipment comprising an inkjet head for discharging a binder containing an ultraviolet-curing compound as droplets onto a powder material layer, a light source for irradiating the binder discharged onto the powder material layer with light, the binder being discharged using the inkjet head according to cross-sectional shape information based on sliced cross-sectional data of a modeled object, and control means for discharging 1.05 to 5.0 times the amount of binder onto the outermost layer of the model as is discharged onto the interior of the model, (3) a three-dimensional model containing a powder material and a binder and formed by imagewise curing the binder, the three-dimensional model having a surface gloss when measured at 20° of 20% or more.

In accordance with the production process of the present invention, a three-dimensional model having highly precise dimensions, and excellent coloration, mechanical strength, surface gloss, and texture can be produced, and a high quality three-dimensional model, which has been impossible to produce, can be produced simply at low cost.

DETAILED DESCRIPTION OF THE INVENTION

Figure 1:
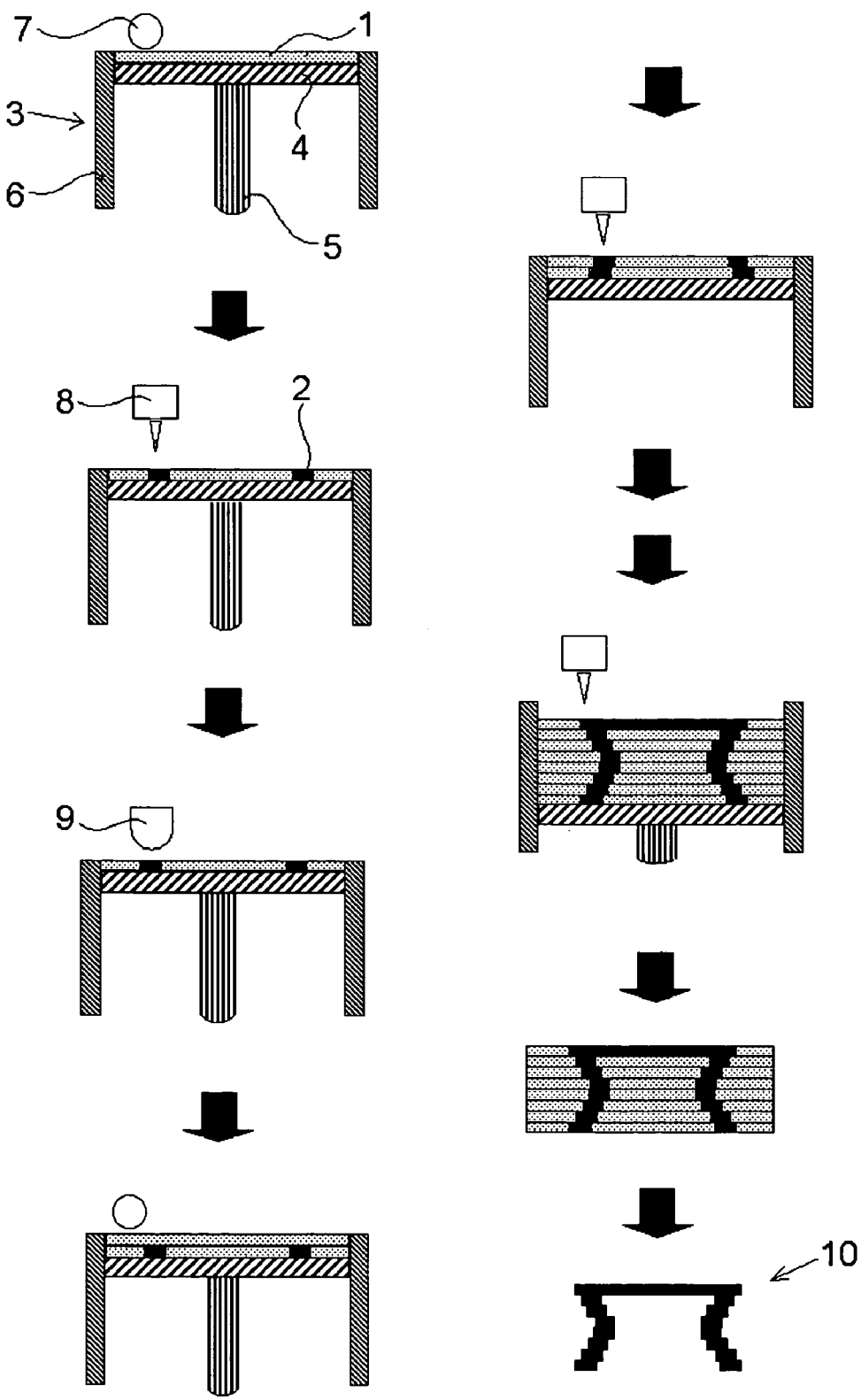
FIG. 1 is a schematic view showing each step of one embodiment of the process for producing a three-dimensional model of the present invention.

The present invention is explained in detail below. A process for producing a three-dimensional model is first explained, and then production equipment used for producing a three-dimensional model is explained.

The present invention relates to a process for producing a three-dimensional model, the process comprising sequentially repeating a step (layer formation step) of forming a layer of a powder material above a support, the layer having a predetermined thickness, and a step (cross-sectional shape formation step) of imagewise bonding the powder material layer by a binder according to cross-sectional data of a modeled object so as to give a cross-sectional shape, the surface gloss of the three-dimensional model obtained when measured at 20° being 20% or more. Furthermore, the present invention relates to a three-dimensional model comprising a powder material and a binder and formed by imagewise curing the binder, the three-dimensional model having a surface gloss when measured at 20° of 20% or more.

The surface gloss of the three-dimensional model obtained by the production process of the present invention when measured at 20° is 20% or more, preferably 30% or more, and more preferably 40% or more.

The surface gloss referred to in the present invention is the surface gloss measured at an incident angle of 20°, and can be measured using, for example, a UGV-6P Digital Variable Angle Gloss Meter (Suga Test Instruments Co., Ltd.).

Furthermore, in the present invention it is preferable to apply a binder to the outermost layer of the model at a level of 1.05 to 5.0 times, and preferably 1.1 to 2.5 times, the amount of binder applied to the interior of the model. Hereinafter, this scaling factor is also called the 'discharge scaling factor (application scaling factor)'. Moreover, 'the outermost layer of the model' referred to in the present invention means a surface of the model that can be seen externally by a normal observation method. When the model is a single body, it is the external outline of the model and corresponds to the whole cross-sectional shape of the lowermost layer forming the base, outline portions of cross-sectional shapes in the middle, and the cross-sectional shape of the uppermost layer forming the top. When the model is a hollow single body, the amount of binder discharged onto the outer surface of the model can be increased, and the amount discharged onto the inner surface, which is usually unseen, may be the same as that for the interior of the model. On the other hand, in the case of a model, such as a ball bearing, in which a plurality of members are combined, the surfaces of two concentric circular rings and a plurality of balls inserted therebetween are areas that can be seen externally, and the entire outer surfaces of the two rings and the plurality of balls corresponds to the outermost layer. The relationship between the outermost layer and grid points of a bitmap in which a cross-sectional shape is further microscopically and finely divided into a grid will be described later.

The average particle size of the powder material is preferably 50 µm or less, and more preferably 1 to 30 µm. When the average particle size is in the above-mentioned range, the surface gloss of the three-dimensional model obtained increases, which is preferable. The average particle size referred to here means a volume-average particle size, and can be measured by, for example, a COULTER MULTISIZER manufactured by Beckman Coulter, Inc.

The particle size distribution can be wide, but is preferably narrow. It is preferable for the particle size distribution to be nearly monodisperse, and the coefficient of variation of the particle size distribution is preferably 20% or less, and more preferably 15% or less. The powder material can be an organic material, an inorganic material, or an inorganic/organic composite material. Details thereof will be explained later.

As the support above which the powder material is laid, a support having any surface profile can be used, but a support having a smooth surface is preferable, and a support having a flat surface can be used preferably. In the production process of the present invention, it is preferable to use a horizontal support having on its perimeter a frame that can be extended to a height greater than that of the three-dimensional model that is to be produced.

With regard to the predetermined thickness for the powder material layer, it is preferably a layer having a thickness of 10 to 500 µm per slice pitch, and more preferably 50 to 150 µm. Each time a layer formation step and a colored cross-sectional shape formation step are repeated, the overall thickness of the stack of powder material layers increases by the above-mentioned slice pitch.

The colored cross-sectional shape referred to here means a shape that corresponds to one of a plurality of sliced cross sections of a modeled object, and that is accompanied by coloring. In particular, the cross-sectional shape of an opaque model can be a hollow shape, and in this case it is sufficient to reproduce the shape in the vicinity of the outline thereof. With regard to coloration, color may be reproduced on the surface alone of the model, and color reproduction of the outline of the shape is important.

A summary of the process for producing a three-dimensional model of the present invention is explained with reference to drawings.

FIG. 1 is a schematic view showing the main steps of one embodiment of the process for producing a three-dimensional model of the present invention.

In the production process of the present invention, a thin layer 1 of a powder material is formed above a support (modeling stage) 4 provided in a three-dimensional modeling section 3. The support 4 is supported by a vertically moving section 5 and its perimeter is surrounded by a frame 6. The thin layer 1 is formed by a blade 7, which extends lengthwise in a direction Y (a direction perpendicular to the plane of the paper), moving in a direction X (the left-to-right direction in the plane of the paper) on surplus powder material, which is supplied from a powder supply section to the support 4. A binder is supplied to the top of the thus-formed thin layer 1 of the powder material, via an inkjet head 8 of a binder application section, according to cross-sectional shape data so as to form a region 2 to which the binder has been applied. This region 2 to which the binder has been applied is cured by exposure to ultraviolet rays from an ultraviolet irradiation section 9, and a cross-sectional shape is formed by bonding the powder material throughout the thickness of the thin layer in the region 2 to which the binder has been applied, and also by bonding it to the cross-sectional shape that is directly below.

Subsequently, the vertically moving section 5 is moved downward by 1 slice pitch, and a new powder material layer is formed.

Binder is supplied to the top of the newly formed thin layer via the inkjet head of the binder application section according to the next adjacent cross-sectional shape data so as to form a new region to which binder has been applied. This region is cured by exposure to ultraviolet rays so as to bond the powder material.

After sequentially repeating formation of the powder material thin layer 1, supply of the binder, and curing a required number of times, a three-dimensional model 10 can be obtained by separating the powder material in the region where no binder has been applied.

Figure 2:
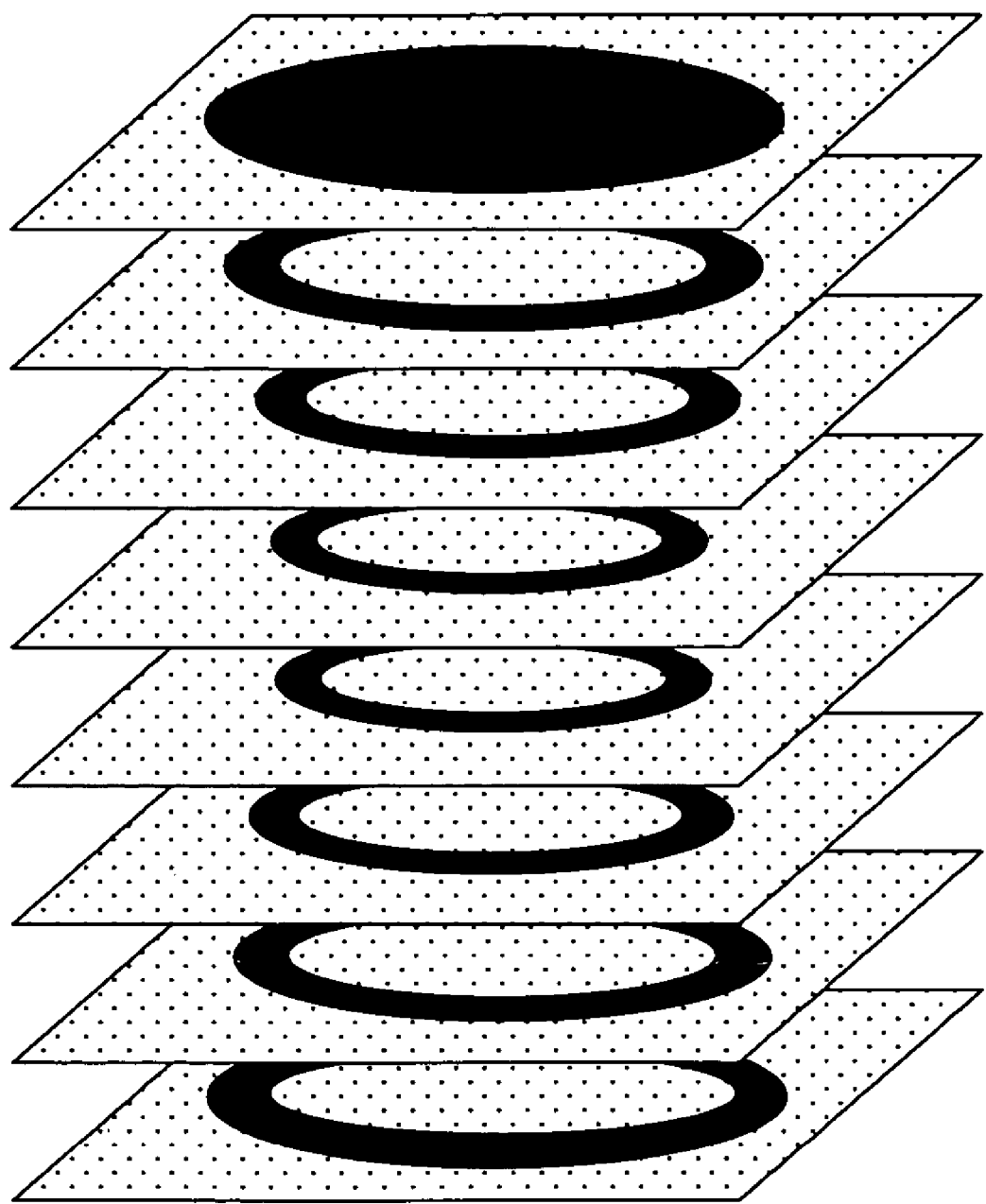
FIG. 2 is a perspective view showing schematically the cross-sectional shape of several layers formed in the production of the three-dimensional model shown in FIG. 1.

FIG. 2 is a perspective view showing schematically the cross-sectional shape formed in each of the adjacent layers in the production of the above-mentioned three-dimensional model.

A preferred embodiment of the process for producing a three-dimensional model of the present invention is explained below. The five steps below include a step of preparing three-dimensional shape color data and a step of preparing colored cross-sectional shape data for each cross section, prior to the (powder) layer formation step and the colored cross-sectional shape formation step.

In a first step, model data representing a three-dimensional modeled object having on its surface a color pattern, etc. are created in a computer. As model data used as a basis for modeling, color three-dimensional model data formed by general 3D-CAD modeling software can be used. It is also possible to utilize data and texture of a three-dimensional colored shape measured using a three-dimensional shape input device.

In a second step, cross-sectional data for each horizontally sliced cross section of the modeled object are formed in a computer from the above-mentioned model data. A cross-sectional body sliced at a pitch (layer thickness $t$) corresponding to the thickness of one layer of the layered powder is cut out of the model data, and shape data and coloration data showing a region where the cross section is present are formed as the cross-sectional data. Specifically, data (STL format, etc.) obtained using three-dimensional CAD can be converted into cross-sectional data sliced at a thickness of 10 to 500 µm. In the present invention, 'shape data' and 'coloration data' are together also called 'colored (cross-sectional) shape data'.

Subsequently, information regarding the layer thickness (slice pitch when forming the cross-sectional data) of the powder and the number of layers (the number of sets of colored shape data) when modeling a modeled object is input from the computer into a drive control section of a pattern formation device.

In a third step, supply of a powder material, which is the material for producing the three-dimensional model on the modeling stage, is carried out. The powder material is spread in a uniformly thick layer shape using a powder material counter-rotating mechanism (hereinafter, called a 'counter roller'), and supply of the powder material is stopped when a predetermined amount of powder has been supplied.

'Sequentially repeating the layer formation step and the cross-sectional shape formation step' referred to in the present invention means not only (1) carrying out a step of forming a cross-sectional shape on the whole surface of a new layer after completing a new layer formation step, but also (2) forming a cross-sectional shape in a region of a newly formed layer before formation of the newly formed layer is completed, while still carrying out the new layer formation step. An example of the latter case has been disclosed in JP-A-2002-307562.

A fourth step is a step of forming a colored cross-sectional shape under the control of the drive control section according to the colored shape data for the cross section. This step preferably employs a non-contact method. As a representative example, an inkjet method is explained.

The shape data and the coloration data created in the second step are converted into finely divided grids of bitmap information for each color of C, M, and Y, and an inkjet head is moved within the XY plane. During the movement, an ultraviolet (UV)-curing binder is discharged appropriately from each inkjet discharge nozzle based on the coloration data. With regard to the binder, it is preferable to use two or more types of binders selected from the group consisting of at least one type of colored binder, a white binder, and a colorless transparent binder. In the present invention, the colored binder does not include a white colored binder.

In the present invention, it is preferable to apply a binder to at least one grid point positioned in the outermost layer of the model at a level of 1.05 to 5.0 times, and preferably 1.1 to 2.5 times, the amount of binder applied to a grid point positioned in the interior of the model. When the amount of binder is in the above-mentioned range, the surface gloss and the strength of the model improve, which is preferable.

Said at least one grid point positioned in the outermost layer of the model includes a grid point of the whole cross-sectional shape of the lowermost layer of the model, a grid point of the whole cross-sectional shape of the uppermost layer, and a grid point (outline grid point) forming the external outline of a cross-sectional shape of a middle layer positioned between the lowermost layer and the uppermost layer, and can include one or a plurality of grid points adjacent to the above grid points (adjacent grid point). In this case, it is not necessary to discharge the same increased level of binder to the outline grid point and to the adjacent grid point. The discharge scaling factor can be adjusted so as to have an appropriate gradation. When it is adjusted, it is not necessary to make the outline grid point have the maximum scaling factor, and it is possible to make the discharge scaling factor of the adjacent grid point immediately next to the outline grid point the maximum.

The discharge scaling factor can be selected appropriately. When the discharge scaling factor is too large, there is a possibility that spreading of the outline might occur, and when the discharge scaling factor is small, a desired surface effect cannot be obtained.

When a larger amount of binder than that discharged onto ah inside grid point is discharged onto the outline grid points forming the cross-sectional shape of the lowermost layer and the cross-sectional shape of the uppermost layer of the model, it is also possible to increase the discharge scaling factor for adjacent grid points of their adjacent cross-sectional shapes as necessary. In an area where the thickness of a powder material layer is thin or where strength is particularly required, it is possible to increase the binder discharge scaling factor of one or more adjacent grid points adjacent to the outline grid point in the same cross-sectional shape or in the adjacent cross-sectional shape as necessary.

Figure 3:
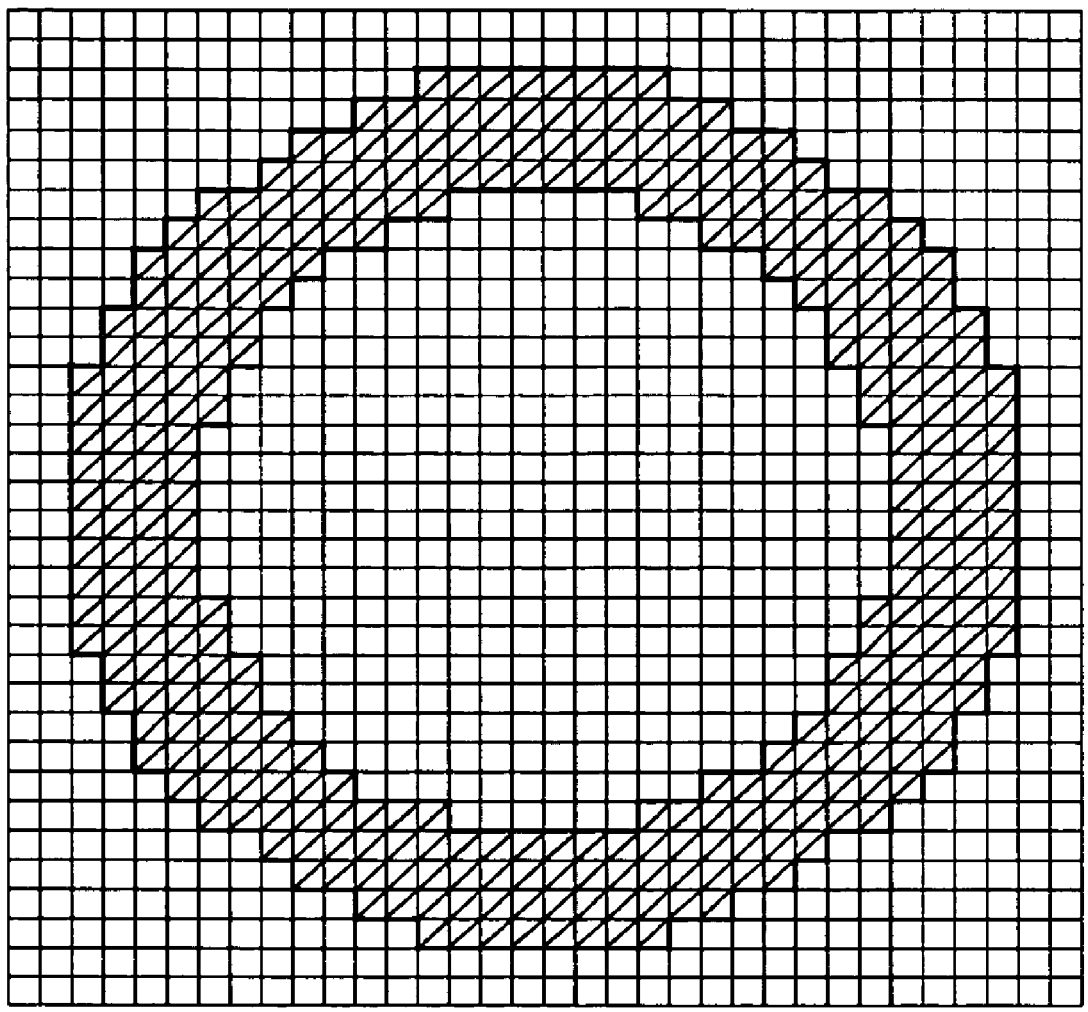
FIG. 3 is a plan view showing one example of cross-sectional data finely divided into a grid.

FIG. 3 is a plan view showing one example of finely divided grid cross-sectional data generated in the second step. In FIG. 3, the hatched grids correspond to regions where a binder is discharged. The discharge scaling factor for grid points positioned in the outermost layer of the model is increased so as to be in the above-mentioned range. For the cross-sectional shapes in the middle, a larger amount of binder is discharged to the outline grid points corresponding to the outer surface than is discharged to the inside grid points. The discharge scaling factor can be increased for several adjacent grid points adjacent to the outline grid point. The 'several adjacent grid points' are preferably 1 to 10 grid points, and more preferably 1 to 5 grid points.

Adjustment of the discharge scaling factor can be carried out by changing the amount of discharge per unit time, and/or increasing the number of times of discharge at the same grid point.

Control is simple when the discharge scaling factor of the outline grid points alone is increased. For example, the discharge scaling factor for the outline grid points alone is made 2 times that for the inside grid points, etc. It is also possible to set the discharge scaling factor of every other adjacent grid point to be 2 times. Control of the number of times of discharge is more simple than control of the amount discharged per unit time. In one preferred embodiment, for example, the amounts discharged for the outline grid points and one layer of adjacent grid points are increased by adjusting the number of times of discharge to once, twice, or three times.

By adjusting the amount of binder discharged per unit time to 0.66 to 1.5 times, the discharge scaling factor can be adjusted more finely. Combining this with adjustment of the number of times of discharge onto 1 grid point, adjustment of the discharge scaling factor can be carried out even more finely.

When the amount discharged onto the outline grid point is increased, the binder spreads beyond a predetermined region, and there is a tendency for the surface smoothness of the three-dimensional model obtained to be impaired. In such a case, the spreading of the binder can be prevented by a measure in which a spread-preventing liquid that is not compatible with the binder is disposed along the outline outside the outline grid points of the cross-sectional shape of the model.

When an ultraviolet-curing compound, which will be described later, is used as the binder, as the spread-preventing liquid, water, methanol, ethanol, butanol, hexanol, ethylene glycol, butanediol, glycerol, diethyl ether, propyl ether, or a hydrocarbon having up to 14 carbons such as hexane, heptane, octane, or decane, which have no compatibility with the ultraviolet-curing compound, can be used singly or as a mixture.

With regard to the colored binders, a combination of the three colors of yellow (Y), magenta (M), and cyan (C), which are subtractive primaries, is preferable. If necessary, a black dye-colored binder (black binder) can be further used as a colored binder in combination. In the present invention, a yellow-colored binder is called a 'yellow binder', a magenta-colored binder is called a 'magenta binder', and a cyan-colored binder is called a 'cyan binder'. An M dye and a C dye may each comprise two, that is, dark- and pale-colored, types of binders. The colorless binder can be used in order to adjust the CMY color densities. Furthermore, a desired effect can be attained by the combined use of a binder (white binder) containing a white (W) pigment such as titanium white.

The total amount of colored binder, colorless binder, and white binder discharged is preferably constant per unit area, for example, per grid point or per four adjacent grid points. As hereinbefore described, it is a characteristic of the present invention that the total amount of binders in the outline grid points is set so that it is increased by a predetermined discharge scaling factor.

As another example of the step of forming a colored cross-sectional shape, it is possible to employ a two-stage step in which, after a colorless ultraviolet-curing binder alone is discharged into a powder material according to the shape data and cured by ultraviolet irradiation, a normal CMY inkjet containing no binder is discharged on the bonded powder material layer according to the coloration data for the layer. In this case, the object of the present invention can be achieved by increasing the discharge scaling factor of the colorless binder at the outline grid points.

At the same time as or after the ultraviolet-curing binder is discharged, the surface of the discharged binder is exposed to ultraviolet rays using an ultraviolet irradiation device, thus forming a powder material bonded body.

When the atmosphere for the UV irradiation is an atmosphere of an inert gas such as nitrogen or argon, the effect of oxygen in delaying radical polymerization of a polymerizable compound can be suppressed.

The inkjet system employed here means mainly an on-demand inkjet system, which includes a piezo on-demand inkjet system, a thermal on-demand ink-jet system, and an electrostatic on-demand inkjet system, and the piezo on-demand inkjet system and the electrostatic on-demand inkjet system are preferable in terms of stability of the UV-curing binder.

In a powder material region to which no binder is applied, the powder is maintained in a separated state.

In a fifth step, the powder material in a region to which no binder has been applied is separated, and a bonded powder body (three-dimensional model) imagewise bonded by the binder is taken out. The powder material that has not been bonded is recovered and can be reused.

By sequentially repeating the third and fourth steps, a three-dimensional model formed by sequentially layering bonded colored powder material bodies corresponding to cross sections obtained by sectioning the modeled object in a plurality of planes can thus be produced.

By bonding into a cross-sectional shape a layer of a powder material having a refractive index $n_1$ by means of a binder that gives a refractive index $n_2$ (here, $-0.1 \leq (n_1-n_2) \leq 0.1$), a transparent or substantially transparent three-dimensional model can be produced. 'Transparent or substantially transparent' or 'nearly transparent' referred to in the present invention means that the transmittance per cm of optical path is 50% or higher.

The three-dimensional model thus obtained can be subjected to a post-treatment step such as cleaning, thermal treatment, resin or wax impregnation, or polishing. Cleaning is carried out by blowing the above-mentioned three-dimensional model and brushing so as to remove any powder remaining in gaps, thus enabling surplus powder to be removed. The thermal treatment increases the strength and the durability of the above-mentioned three-dimensional model. Wax impregnation reduces the porosity, imparts water resistance to the above-mentioned three-dimensional model, and makes finishing by polishing easy. Finishing by polishing improves the surface smoothness.

Each component used in the present invention is explained below. Specific details should not be construed as being limited to those in the explanation below.

(Powder Material)

As the powder material, any of an inorganic powder, an organic powder, and an inorganic/organic composite powder can be used. Examples of the inorganic powder include metals, oxides, composite oxides hydroxides, carbonates, sulfates, silicates, phosphates, nitrides, carbides, sulfides, and composites of at least two types thereof. Specific examples thereof include magnesium hydroxide, silica gel, alumina, aluminum hydroxide, glass, titanium oxide, zinc oxide, zirconium oxide, tin oxide, potassium titanate, aluminum borate, magnesium oxide, magnesium borate, calcium hydroxide, basic magnesium sulfate, calcium carbonate, magnesium carbonate, calcium sulfate, magnesium sulfate, calcium silicate, magnesium silicate, calcium phosphate, silicon nitride, titanium nitride, aluminum nitride, silicon carbide, titanium carbide, zinc sulfide, and composites of at least two types thereof. Preferred examples include magnesium hydroxide, silica gel, alumina, aluminum hydroxide, glass, calcium carbonate, magnesium carbonate, calcium sulfate, and magnesium sulfate.

Examples of the organic powder include synthetic organic powders and natural polymer powders. Specific examples include acrylic resins, polyethylene, polypropylene, polyethylene oxide, polypropylene oxide, polyethyleneimine, polystyrene, polyurethane, polyurea, polyester, polyamide, polyimide, carboxymethyl cellulose, gelatin, starch, chitin, and chitosan, preferred examples include acrylic resins, polyurethane, gelatin, and polystyrene, and more preferred examples include polymer resin particles of a UV-curing binder formed from an acrylic resin.

As the organic powder material, powder particles obtained by grinding a bulk-polymerized binder monomer can be used. The binder monomer is subjected to suspension polymerization or pearl polymerization, and a powder material having a desired particle size can be obtained. In this case, the refractive index of the powder material and the refractive index of the binder can be made similar.

Examples of the inorganic/organic composite powder include a composite of the above-mentioned organic powder and inorganic powder.

The shape of the powder material can be any of amorphous, spherical, tabular, acicular, porous, etc. forms.

The refractive index $n_1$ of the powder material is preferably in the range of 1.4 to 1.7.

The refractive index of a binder for bonding the powder material particles to each other is defined as $n_2$. When an ethylenically unsaturated monomer is used as the binder, the refractive index of the bonding agent formed by polymerization of this monomer is defined as $n_2$. The smaller the absolute value of $(n_1-n_2)$, the higher the transparency of the model obtained. When the absolute value of the difference between the refractive indexes is 0.1 or less, the transparency is high, and when it is 0.06 or less, a nearly transparent model can be obtained.

(Binder)

As the binder, a UV-curing binder that includes an ultraviolet-curing compound can be used preferably. The UV-curing binder comprises a photopolymerization initiator and at least one type of polymerizable compound as essential components; substantially all of the constituent materials are cured by UV light, and have the function of bonding the powder material. With regard to the proportions of the constituent materials, the photopolymerization initiator is preferably 0.05 to 10 wt %, and more preferably 0.1 to 5 wt %, and the polymerizable compound is preferably 90 to 99.95 wt %, and more preferably 95 wt % to 99.9 wt %.

The viscosity (25° C.) of the binder solution is preferably 1 to 100 mPa·s, and more preferably 10 to 50 mPa·s. It is preferable to mix a polyfunctional monomer having high viscosity and a monofunctional monomer having low viscosity appropriately so as to attain the above viscosity range.

The amount of binder used is preferably, as a ratio by volume of the powder material to the total amount of binders, powder material: binder=90:10 to 25:75, and more preferably powder material: binder=80:20 to 50:50.

When the binder contains a pigment, 'binder' means the total amount of the binder and the pigment.

<Polymerizable Compound>

With regard to the polymerizable compound that can be used in the UV-curing binder, those for which addition-polymerization or ring-opening polymerization is started by a radical species, a cationic species, etc. formed from a photopolymerization initiator by irradiation with UV light and a polymer is formed are preferably used. With regard to the mode of polymerization of the addition-polymerization, there are radical, cationic, anionic, metathesis, and coordination polymerization. With regard to the mode of polymerization of the ring-opening polymerization, there are cationic, anionic, radical, metathesis, and coordination polymerization.

As an addition-polymerizable compound, a compound having at least one ethylenically unsaturated double bond can be cited. As the addition-polymerizable compound, a compound having at least one, and preferably two, terminal ethylenically unsaturated bonds can be used preferably. Such terminally ethylenically unsaturated compounds are widely known in the present industrial field. In the present invention, they can be used without particular restriction as long as the binder composition can be discharged stably from an inkjet nozzle.

The ethylenically unsaturated polymerizable compound is, in terms of its chemical configuration, a monofunctional polymerizable compound, a polyfunctional polymerizable compound (i.e., difunctional, trifunctional, or 4- to 6-functional polymerizable compound, etc.), or a mixture thereof. Examples of the monofunctional polymerizable compound include unsaturated carboxylic acids (e.g., acrylic acid, methacrylic acid, itaconic acid, crotonic acid, isocrotonic acid, and maleic acid), esters thereof, and amides thereof. Examples of the polyfunctional polymerizable compound include esters of an unsaturated carboxylic acid and an aliphatic polyhydric alcohol compound and amides of an unsaturated carboxylic acid and an aliphatic polyhydric amine compound.

It is also possible to use an adduct between an unsaturated carboxylic acid ester or amide having a nucleophilic substituent such as a hydroxyl group, an amino group, or a mercapto group, and a monofunctional or polyfunctional isocyanate or epoxide; a dehydration-condensation product with a monofunctional or polyfunctional carboxylic acid; etc. It is also possible to use an adduct between an unsaturated carboxylic acid ester or amide having an electrophilic substituent such as an isocyanate group or an epoxy group and a monofunctional or polyfunctional alcohol, amine or thiol; or a substitution product between an unsaturated carboxylic acid ester or amide having a leaving group such as a halogen or a tosyloxy group and a monofunctional or polyfunctional alcohol, amine or thiol.

As another example, it is also possible to use a group of compounds in which the above-mentioned unsaturated carboxylic acid is replaced with an unsaturated phosphonic acid, styrene, etc.

A representative example of the radically polymerizable compound that is an ester of an unsaturated carboxylic acid and a aliphatic polyhydric alcohol compound is a (meth) acrylate ester, and specific examples thereof include ethylene glycol di(meth)acrylate, triethylene glycol di(meth) acrylate, 1,3-butanediol di(meth)acrylate, tetramethylene glycol di(meth)acrylate, propylene glycol di(meth)acrylate, neopentyl glycol di(meth)acrylate, trimethylolpropane tri(meth)acrylate, trimethylolpropane tri((meth)acryloyloxypropyl) ether, trimethylolethane tri(meth)acrylate, hexanediol di(meth)acrylate, 1,4-cyclohexanediol di(meth)acrylate, tetraethylene glycol di(meth)acrylate, pentaerythritol di(meth)acrylate, pentaerythritol tri(meth)acrylate, pentaerythritol tetra(meth)acrylate, dipentaerythritol di(meth)acrylate, dipentaerythritol hexa(meth)acrylate, sorbitol tri(meth)acrylate, sorbitol tetra(meth)acrylate, sorbitol penta(meth)acrylate, sorbitol hexa(meth)acrylate, tri((meth)acryloyloxyethyl) isocyanurate, polyester (meth)acrylate oligomer, bis[p-(3-(meth)acryloxy-2-hydroxypropoxy)phenyl]dimethylmethane, and bis-[p((meth)acryloxyethoxy)phenyl]dimethylmethane.

The above-mentioned notation '(meth)acrylate ester' is an abbreviation denoting that it can take either the methacrylate ester structure or the acrylate ester structure.

In addition to the (meth)acrylate ester, an itaconate ester, a crotonate ester, an isocrotonate ester, a maleate ester, etc. can also be used as the polymerizable compound.

Examples of the itaconate ester include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of the crotonate ester include ethylene glycol dicrotonate, tetramethylene glycol dicrotonate, pentaerythritol dicrotonate, and sorbitol tetracrotonate.

Examples of the isocrotonate ester include ethylene glycol diisocrotonate, pentaerythritol diisocrotonate, and sorbitol tetraisocrotonate.

Examples of the maleate ester include ethylene glycol dimaleate, triethylene glycol dimaleate, pentaerythritol dimaleate, and sorbitol tetramaleate.

Examples of other esters include aliphatic alcohol esters disclosed in, for example, JP-B-46-27926, JP-B-51-47334 (JP-B denotes a Japanese examined patent application publication), and JP-A-57-196231, those having an aromatic skeleton disclosed in JP-A-59-5240, JP-A-59-5241, and JP-A-2-226149, and those containing an amino group disclosed in JP-A-1-165613.

Specific examples of the amide monomer of an unsaturated carboxylic acid and an aliphatic polyhydric amine compound include methylenebisacrylamide, methylenebismethacrylamide, 1,6-hexamethylenebisacrylamide, 1,6-hexamethylenebismethacrylamide, diethylenetriaminetrisacrylamide, xylylenebisacrylamide, and xylylenebismethacrylamide.

Other preferred examples of amide monomers include those having a cyclohexylene structure disclosed in JP-B-54-21726.

Furthermore, an addition-polymerizable urethane compound produced by an addition reaction of an isocyanate and a hydroxyl group is also desirable, and specific examples thereof include a vinylurethane compound having at least two polymerizable vinyl groups per molecule, which is obtained by adding a hydroxyl group-containing vinyl monomer represented by Formula (I) below to a polyisocyanate compound having at least two isocyanate groups per molecule, such as that described in JP-B-48-41708.

    Formula (I)

(Here, $R^1$ and $R^2$ denote H or $CH_3$.)

In the present invention, a cationic ring-opening polymerizable compound having at least one cyclic ether group per molecule such as an epoxy group and/or an oxetane group can be used, together with a UV cationic polymerization initiator, as the UV-curing binder.

A cationically polymerizable compound that can be used preferably in the present invention is generally explained below. As the cationically polymerizable compound, a curable compound containing a ring-opening polymerizable group can be cited; thereamong, a heterocyclic group-containing curable compound is preferable. Examples of such a curable compound include cyclic iminoethers and vinyl ethers such as epoxy derivatives, oxetane derivatives, tetrahydrofuran derivatives, cyclic lactone derivatives, cyclic carbonate derivatives, and oxazoline derivatives; in particular, epoxy derivatives, oxetane derivatives, and vinyl ethers are preferable.

Preferred examples of the epoxy derivative can be broadly divided into monofunctional glycidyl ethers, polyfunctional glycidyl ethers, monofunctional alicyclic epoxides, and polyfunctional alicyclic epoxides.

Examples of specific monofunctional and polyfunctional glycidyl ether compounds include diglycidyl ethers (e.g., ethylene glycol diglycidyl ether, bisphenol A diglycidyl ether), tri- or higher-functional glycidyl ethers (trimethylolethane triglycidyl ether, trimethylolpropane triglycidyl ether, glycerol triglycidyl ether, triglycidyl trishydroxyethyl isocyanurate, etc.), tetra- or higher-functional glycidyl ethers (sorbitol tetraglycidyl ether, pentaerythritol tetraglycidyl ether, a polyglycidyl ether of cresol novolac resin, a polyglycidyl ether of phenol novolac resin, etc.), alicyclic epoxides (Celloxide 2021P, Celloxide 2081, Epolead GT-301, Epolead GT-401 (all manufactured by Daicel Chemical Industries, Ltd.), EHPE (manufactured by Daicel Chemical Industries, Ltd.), polycyclohexyl epoxy methyl ether of phenol novolac resin, etc., and oxetanes (OX-SQ, PNOX-1009 (all manufactured by Toagosei Co., Ltd.), etc.), but the present invention is not limited thereby.

In the present invention, an alicyclic epoxy derivative can be preferably used. The 'alicyclic epoxy group' referred to here means a partial structure that is formed by epoxidizing a double bond of a cycloalkene ring such as a cyclopentene group or a cyclohexene group using an appropriate oxidizing agent such as hydrogen peroxide or a peracid.

With regard to the alicyclic epoxy compound, polyfunctional alicyclic epoxides having at least two cyclohexene oxide groups or cyclopentene oxide groups per molecule are preferable. Specific examples of monofunctional or polyfunctional alicyclic epoxy compounds include 4-vinylcyclohexene dioxide, (3,4-epoxycyclohexyl)methyl-3,4-epoxycyclohexyl carboxylate, di(3,4-epoxycyclohexyl) adipate, di(3,4-epoxycyclohexylmethyl) adipate, bis(2,3-epoxycyclopentyl) ether, di(2,3-epoxy-6-methylcyclohexylmethyl) adipate, and dicyclopentadiene dioxide.

The alicyclic epoxy compound can be used singly or in a combination of two or more types.

Various types of alicyclic epoxy compounds are commercially available from Union Carbide Japan Ltd. (Dow Chemical Japan, Ltd.), Daicel Chemical Industries, Ltd., etc.

It is also possible to use a normal glycidyl compound having an epoxy group and having no alicyclic structure in the molecule singly or in combination with the above-mentioned alicyclic epoxy compound.

Examples of such a normal glycidyl compound include a glycidyl ether compound and a glycidyl ester compound, and it is preferable to use a glycidyl ether compound in combination.

Specific examples of the glycidyl ether compound include aromatic glycidyl ether compounds such as 1,3-bis(2,3-epoxypropyloxy)benzene, a bisphenol A epoxy resin, a bisphenol F epoxy resin, a phenol novolac epoxy resin, a cresol novolac epoxy resin, and a trisphenolmethane epoxy resin, and aliphatic glycidyl ether compounds such as 1,4-butanediol glycidyl ether, glycerol triglycidyl ether, propylene glycol diglycidyl ether, and trimethylolpropane triglycidyl ether. Examples of the glycidyl ester include the glycidyl ester of linolenic acid dimer.

The glycidyl ethers are commercially available from Yuka Shell Epoxy Co., Ltd. (Japan Epoxy Resin Co., Ltd.), etc.

In the present invention, it is possible to use a compound having an oxetanyl group, which is a 4-membered cyclic ether (hereinafter, also called simply an 'oxetane compound'). The oxetanyl group-containing compound is a compound having at least one oxetanyl group per molecule. These oxetanyl group-containing compounds can be broadly divided into monofunctional oxetane compounds having one oxetanyl group per molecule and polyfunctional oxetane compounds having at least two oxetanyl groups per molecule.

As the monofunctional oxetane compound, compounds represented by Formula (1) below are preferable.

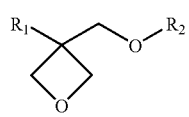

(1)

In Formula (1), $R_1$ denotes a methyl group or an ethyl group. $R_2$ denotes a hydrocarbon group having 6 to 12 carbons.

The hydrocarbon group denoted by $R_2$ can be a phenyl group or a benzyl group, is preferably an alkyl group having 6 to 8 carbons, and is particularly preferably a branched alkyl group such as 2-ethylhexyl. Examples of the oxetane compound in which $R_2$ is a phenyl group are described in JP-A-11-140279. Examples of the oxetane compound in which $R_2$ is a benzyl group, which can have a substituent, are described in JP-A-6-16804.

In the present invention, a polyfunctional oxetane compound can be used, and preferred compounds are those represented by Formula (2) below.

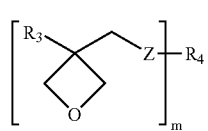

(2)

In Formula (2), $m$ denotes a natural number of 2, 3, or 4, and Z denotes an oxygen atom, a sulfur atom, or a selenium atom. $R_3$ is a hydrogen atom, a fluorine atom, a straight-chain or branched alkyl group having 1 to 6 carbons, a fluoro alkyl or allyl group having 1 to 6 carbons, a phenyl group, or a furyl group. $R_4$ is an m-valent linking group, is preferably a group having 1 to 20 carbons, and can contain one or more oxygen or sulfur atoms.

Z is preferably an oxygen atom, $R_3$ is preferably an ethyl group, $m$ is preferably 2, $R_4$ is preferably a linear or branched alkylene group having 1 to 16 carbons or a linear or branched poly(alkyleneoxy) group, and a compound having any two or more of the preferred $R_3$, $R_4$, Z, and $m$ is more preferable.

As the UV-curing binder of the present invention, it is preferable to use a radically polymerizable ethylenically unsaturated compound and a cationically polymerizable cyclic ether (epoxy derivative and/or oxetane derivative) in combination. Since it has an interpenetrating polymer net (IPN) structure, there is the advantage that a bonded body having balanced physical properties can be obtained. In this case, as a photopolymerization initiator, a radical photopolymerization initiator and a cationic photopolymerization initiator (an onium salt, etc.) are preferably used in combination.

It is preferable that the volatile component content of the cured UV-curing binder is 5 wt % or less. Because of this, it is preferable to employ as the binder a solvent-free formulation containing no organic solvent. It is preferable for the amount of monofunctional ethylenically unsaturated monomer used to be 70% or less of the amount of all monomers.

In order to reduce the volatile component content after curing, the residual monomer may be post polymerized, after a three-dimensional model is produced, by irradiation with UV light or by heating.

<Photopolymerization Initiator>

The curable binder used in the present invention can be cured by a thermal polymerization initiator, but is preferably cured by a photopolymerization initiator.

The photopolymerization initiator used in the present invention referred to here means a compound that generates active radical or cationic species by actinic radiation, and initiates and promotes a polymerization reaction of the binder. As the actinic radiation, radioactive radiation, γ-rays, α-rays, an electron beam, ultraviolet rays, etc. can be used. In particular, a method in which ultraviolet rays are used for curing is preferable.

The thermal polymerization initiator that can be used in the present invention can employ a known compound with a bond having a small bond-dissociation energy. The thermal polymerization initiator can be used singly or in a combination of two or more types.

Examples of the thermal polymerization initiator include organic halogenated compounds, organic peroxide compounds, azo polymerization initiators, azide compounds, metallocene compounds, hexaaryl biimidazole compounds, organic boric acid compounds, disulfone compounds, and onium salt compounds.

Specific examples of the organic halogenated compounds include compounds described in Wakabayashi et al., Bull. Chem. Soc. Japan, 42, 2924 (1969), U.S. Pat. No. 3,905,815, JP-B-46-4605, JP-A-48-36281, JP-A-55-32070, JP-A-60-239736, JP-A-61-169835, JP-A-61-169837, JP-A-62-58241, JP-A-62-212401, JP-A-63-70243, JP-A-63-298339, M. P. Hutt 'Journal of Heterocyclic Chemistry' 1 (No. 3), (1970), etc. and, in particular, an s-triazine compound or an oxazole compound having a trihalomethyl substituent can be cited.

More preferred is an s-triazine derivative in which at least one mono-, di-, or tri-halogen-substituted methyl group is bonded to the s-triazine ring, and specific examples thereof include 2,4,6-tris(monochloromethyl)-s-triazine, 2,4,6-tris (dichloromethyl)-s-triazine, 2,4,6-tris(trichloromethyl)-s-triazine, 2-methyl-4,6-bis(trichloromethyl)-s-triazine, 2-n-propyl-4,6-bis(trichloromethyl)-s-triazine, 2-(α,α,β-trichloroethyl)-4,6-bis(trichloromethyl)-s-triazine, 2-phenyl-4,6-bis(trichloromethyl)-s-triazine, 2-(p-methoxyphenyl)4,6-bis(trichloromethyl)-s-triazine, 2-(3,4-epoxyphenyl)-4,6-bis(trichloromethyl)-s-triazine, 2-(p-chlorophenyl)-4,6-bis(trichloromethyl)-s-triazine, 2-[1-(p-methoxyphenyl)-2,4-butadienyl]-4,6-bis(trichloromethyl)-s-triazine, 2-styryl-4,6-bis(trichloromethyl)-s-triazine, 2-(p-methoxystyryl)-4,6-bis(trichloromethyl)-s-triazine, 2-(p-isopropyloxystyryl)4,6-bis(trichloromethyl)-s-triazine, 2-(p-tolyl)-4,6-bis(trichloromethyl)-s-triazine, 2-(4-naphthoxynaphthyl)-4,6-bis(trichloromethyl)-s-triazine, 2-phenylthio-4,6-bis(trichloromethyl)-s-triazine, 2-benzylthio-4,6-bis(trichloromethyl)-s-triazine, 2,4,6-tris (dibromomethyl)-s-triazine, 2,4,6-tris(tribromomethyl)-s-triazine, 2-methyl-4,6-bis(tribromomethyl)-s-triazine, and 2-methoxy-4,6-bis(tribromomethyl)-s-triazine.

Examples of the above-mentioned organic peroxide compounds include trimethylcyclohexanone peroxide, acetylacetone peroxide, 1,1-bis(tert-butylperoxy)-3,3,5-trimethylcyclohexane, 1,1-bis(tert-butylperoxy)cyclohexane, 2,2-bis(tert-butylperoxy)butane, tert-butyl hydroperoxide, cumene hydroperoxide, diisopropylbenzene hydroperoxide, 2,5-dimethylhexane-2,5-dihydroperoxide, 1,1,3,3-tetramethylbutyl hydroperoxide, tert-butylcumyl peroxide, dicumyl peroxide, 2,5-dimethyl-2,5-di(tert-butylperoxy)hexane, succinic peroxide, benzoyl peroxide, 2,4-dichlorobenzoyl peroxide, diisopropyl peroxydicarbonate, di-2-ethylhexyl peroxydicarbonate, di-2-ethoxyethylperoxy dicarbonate, dimethoxyisopropyl peroxycarbonate, di(3-methyl-3-methoxybutyl) peroxydicarbonate, tert-butyl peroxyacetate, tert-butyl peroxypivalate, tert-butyl peroxyneodecanoate, tert-butyl peroxyoctanoate, tert-butyl peroxylaurate, tercyl carbonate, 3,3',4,4'-tetra-(t-butylperoxycarbonyl)benzophenone, 3,3',4,4'-tetra-(t-hexylperoxycarbonyl)benzophenone, 3,3',4,4'-tetra-(pisopropylcumylperoxycarbonyl)benzophenone, carbonyldi(t-butylperoxydihydrogendiphthalate), and carbonyldi(t-hexylperoxydihydrogendiphthalate).

Examples of the above-mentioned azo compounds include azo compounds described in, for example, JP-A-8-108621.

Examples of the above-mentioned metallocene compounds include various types of titanocene compounds described in JP-A-59-152396, JP-A-61-151197, JP-A-63-41484, JP-A-2-249, JP-A-24705, and JP-A-5-83588, specific examples thereof including dicyclopentadienyl-Ti-bisphenyl, dicyclopentadienyl-Ti-bis-2,6-difluorophen-1-yl, dicyclopentadienyl-Ti-bis-2,4-difluorophen-1-yl, dicyclopentadienyl-Ti-bis-2,4,6-trifluorophen-1-yl, dicyclopentadienyl-Ti-bis-2,3,5,6-tetrafluorophen-1-yl, dicyclopentadienyl-Ti-bis-2,3,4,5,6-pentafluorophen-1-yl, dimethylcyclopentadienyl-Ti-bis-2,6-difluorophen-1-yl, dimethylcyclopentadienyl-Ti-bis-2,4,6-trifluorophen-1-yl, dimethylcyclopentadienyl-Ti-bis-2,3,5,6-tetrafluorophen-1-yl, dimethylcyclopentadienyl-Ti-bis-2,3,4,5,6-pentafluorophen-1-yl, and iron-allene complexes described in JP-A-1-304453 and JP-A-1-152109.

Examples of the above-mentioned hexaarylbiimidazole compounds include various compounds described in JP-B-6-29285, U.S. Pat. Nos. 3,479,185, 4,311,783, and 4,622,286, and specific examples thereof include 2,2'-bis(o-chlorophenyl)-4,4',5,5'-tetraphenylbiimidazole, 2,2'-bis(o-bromophenyl)4,4',5,5'-tetraphenylbiimidazole, 2,2'-bis(o,p-dichlorophenyl)-4,4', 5,5'-tetraphenylbiimidazole, 2,2'-bis(o-chlorophenyl)4,4',5,5'-tetra(m-methoxyphenyl) biimidazole, 2,2'-bis(o,o'-dichlorophenyl)4,4',5,5'-tetraphenylbiimidazole, 2,2'-bis(o-nitrophenyl)4,4',5,5'-tetraphenylbiimidazole, 2,2'-bis(o-methylphenyl)4,4',5,5'-tetraphenylbiimidazole, and 2,2'-bis(o-trifluorophenyl)4,4',5,5'-tetraphenylbiimidazole.

Specific examples of the above-mentioned organic boric acid salt compounds include organic boric acid salts described in JP-A-62-143044, JP-A-62-150242, JP-A-9-188685, JP-A-9-188686, JP-A-9-188710, JP-A-2000-131837, JP-A-2002-107916, Japanese Registered Patent No. 2764769, JP-A-2002-116539, Kunz, Martin 'Rad Tech '98. Proceedings Apr. 19-22, 1998, Chicago', etc., organic borosulfonium complexes and organic borooxosulfonium complexes described in JP-A-6-157623, JP-A-6-175564, and JP-A-6-175561, organic boroiodonium complexes described in JP-A-6-175554 and JP-A-6-175553, organic borophosphonium complexes described in JP-A-9-188710, and organic boron transition metal coordination complexes described in JP-A-6-348011, JP-A-7-128785, JP-A-7-140589, JP-A-7-306527, JP-A-7-292014, etc.

Examples of the above-mentioned disulfone compounds include compounds described in JP-A-61-166544, JP-A-2002-328465, etc.

Preferred examples of the polymerization initiator that generates radicals by the action of light include acetophenone compounds, benzoin compounds, benzophenone compounds, thioxanthone compounds, and benzil compounds. Examples of the acetophenone compounds include 2,2-dimethoxy-2-phenylacetophenone, α-hydroxy-2-methylphenylpropanone, 1-hydroxy-1-methylethyl-(p-isopropylphenyl) ketone, 1-hydroxy-1-(p-dodecylphenyl) ketone, 2-methyl-(4'-(methylthio)phenyl)-2-morpholino-1-propanone, 2,2-diethoxyacetophenone, 2-hydroxymethyl-1-phenylpropan-1-one, 4'-isopropyl-2-hydroxy-2-methylpropiophenone, 2-hydroxy-2-methylpropiophenone, p-dimethylaminoacetone, p-tert-butyldichloroacetophenone, p-tert-butyltrichloroacetophenone, p-azidobenzalacetophenone, and 1-hydroxycyclohexyl phenyl ketone. Examples of the benzoin compounds include benzoin, benzoin methyl ether, benzoin ethyl ether, benzoin n-propyl ether, benzoin isopropyl ether, benzoin n-butyl ether, benzoin isobutyl ether, and benzil dimethyl ketal. Examples of the benzophenone compounds include benzophenone, methyl o-benzoylbenzoate, Michler's ketone, 2-methylbenzophenone, 3-methylbenzophenone, 4-methylbenzophenone, 2-chlorobenzophenone, 4-bromobenzophenone, 2-carboxybenzophenone, 4,4'-bisdiethylaminobenzophenone, and 4,4'-dichlorobenzophenone. Examples of the thioxanthone compounds include thioxanthone, 2-methylthioxanthone, 2-ethylthioxanthone, 2-isopropylthioxanthone, 4-isopropylthioxanthone, 2-chlorothioxanthone, 2,4-dimethylthioxanthone, 2,4-diethylthioxanthone, and diisopropylthioxanthone. Examples of the benzil compounds include benzil and benzil-β-methoxyethyl acetal.

It is also possible to use as a photopolymerization promoter a benzoate ester derivative such as ethyl p-dimethylaminobenzoate or ethyl p-diethylaminobenzoate.

As described below, a sulfonium salt, an iodonium salt, etc., which are usually used as photo cation generators, can be used as radical generators by irradiation with ultraviolet rays, and they can therefore be used on their own in the present invention. Moreover, in order to increase the sensitivity, in addition to the polymerization initiator, a sensitizer can be used. Examples of the sensitizer include n-butylamine, triethylamine, tri-n-butylphosphine, and a thioxanthone derivative.

With regard to the photopolymerization initiator that generates active cationic species by ultraviolet rays, an onium salt initiator, for example, an aromatic sulfonium salt such as a triaryl sulfonium salt, or an aromatic iodonium salt such as a diaryl iodonium salt is useful, and a nonionic initiator such as a nitrobenzyl ester of a sulfonic acid can also be used. Furthermore, known photopolymerization initiators described in 'Imeijingu You Yukizairyo' (Organic Materials for Imaging), Ed. by The Japanese Research Association for Organic Electronics Materials, Bun-shin Publishing (1997) can be used.

As a photoreaction initiator, an aromatic sulfonium salt, etc. is preferable since it is relatively stable thermally.

When an aromatic sulfonium salt or an aromatic iodonium salt is used as an onium salt photoreaction initiator, examples of its negative counterion include $BF_4^-$, $AsF_6^-$, $SbF_6^-$, $PF_6^-$, and $B(C_6F_5)_4^-$. As the initiator, the aromatic sulfonium $PF_6$ salt or $SbF_6$ salt can be used preferably since it has solubility and an appropriate polymerization activity. In order to improve the solubility, it is preferable to employ a chemical structure in which at least one alkyl or alkoxy group having 1 to 10 carbons is introduced into the aromatic group, normally a phenyl group, of the aromatic iodonium salt or aromatic sulfonium salt.

The aromatic sulfonium $PF_6$ salts and $SbF_6$ salts are commercially available from Union Carbide Japan, etc. The aromatic sulfonium $PF_6$ salts are also commercially available from Asahi Denka Co., Ltd. under the product name Adeka Optomer SP series.

Since aromatic sulfonium salts have an absorption up to about 360 nm, and aromatic iodonium salts have an absorption up to about 320 nm, in order to cure them, ultraviolet rays having spectral energy in this region are preferably applied.

<Polymerizable Viscosity-adjusting Compound>

As a polymerizable viscosity-adjusting compound, a compound having low viscosity and being capable of copolymerizing with a polymerizable compound is used. Examples thereof include an acrylate, a methacrylate, and an acrylamide. Specific examples thereof include tolyloxyethyl (meth)acrylate, phenyloxyethyl (meth)acrylate, cyclohexyl (meth)acrylate, ethyl (meth)acrylate, methyl (meth)acrylate, ethylene glycol di(meth)acrylate, divinylbenzene, methylenebisacrylamide, and 1,6-di(meth)acryloyloxyhexane. Tolyloxyethyl (meth)acrylate, ethylene glycol di(meth)acrylate, 1,6-di(meth)acryloyloxyhexane, etc. are preferable.

With regard to the ring-opening polymerizable cyclic ethers, although di- or higher-functional cyclic ethers are generally highly reactive, their viscosities are also high. A monofunctional cyclic ether can be used in combination in order to attain a low viscosity.

(Colorant)

Colorants that can be used in the production process of the present invention can be broadly divided into dyes and pigments, and dyes can be used preferably.

With regard to the dyes, the use of subtractive primaries, that is, yellow (Y), magenta (M), and cyan (C), enables a wide range of hues to be reproduced at different saturations. In the present invention, it is preferable to use dyes that are used for photographic color prints. Details thereof are explained below.

Examples of the yellow dye include ketoimine type dyes obtained from couplers represented by Formulae (I) and (II) in U.S. Pat. Nos. 3,933,501, 4,022,620, 4,326,024, 4,401,752, and 4,248,961, JP-B-58-10739; GB Pat. Nos. 1,425,020 and 1,476,760, U.S. Pat. Nos. 3,973,968, 4,314,023, and 4,511,649, and EP Pat. Nos. 249,473A, and 502,424A; couplers represented by Formulae (1) and (2) in EP Pat. No. 513,496A (in particular, Y-28 on page 18); couplers represented by Formula (I) of Claim 1 in EP Pat. No. 568,037A; couplers represented by Formula (I) of lines 45 to 55 in Column 1 in U.S. Pat. No. 5,066,576; couplers represented by Formula (I) in Paragraph 0008 in JP-A-4-274425; couplers of Claim 1 on page 40 in EP Pat. No. 498,381A1 (in particular, D-35 on page 18); couplers represented by Formula (Y) on page 4 in EP Pat. No. 447,969A1 (in particular, Y-1 (page 17) and Y-54 (page 41)); and couplers represented by Formulae (II) to (IV) on lines 36 to 58 of Column 7 in U.S. Pat. No. 4,476,219 (in particular, 11-17 and 19 (Column 17), and 11-24 (Column 19)). Dyes described in JP-A-2001-294773, JP-A-2002-121414, JP-A-2002-105370, JP-A-2003-26974, and JP-A-2003-73598 are preferable; in particular, pyrazole compounds represented by Formula (Y-II) described in JP-A-2003-73598 are more preferably used, and Y-1 below can be cited as an example.

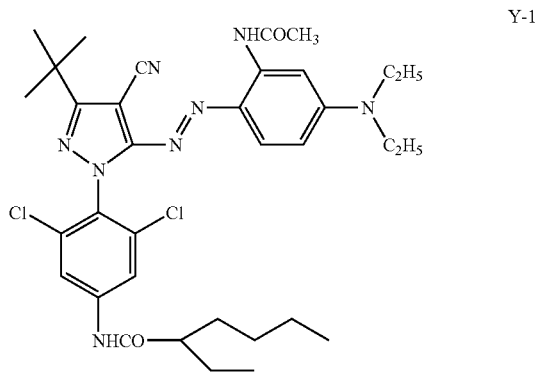

Y-1

Examples of the magenta dye include dyes described in JP-A-2001-181549, JP-A-2002-121414, JP-A-2002-105370, JP-A-2003-12981, and JP-A-2003-26974.

In particular, pyrazolotriazole azomethine compounds represented by Formula (III) described in JP-A-2002-121414 are preferable, and M-1 and M-6 below can be cited as an example.

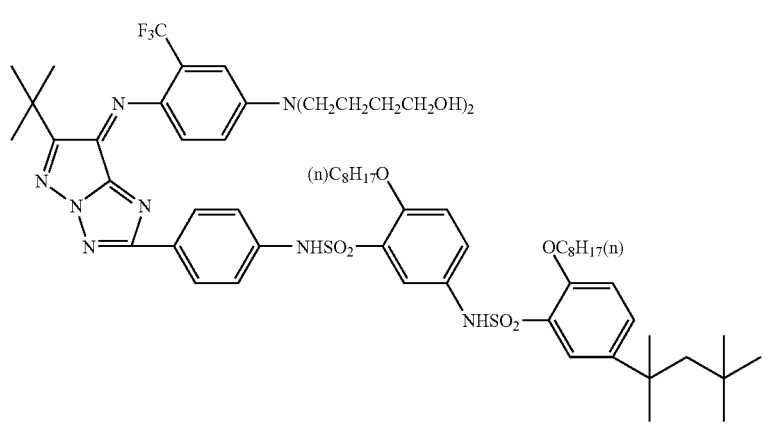
M-1
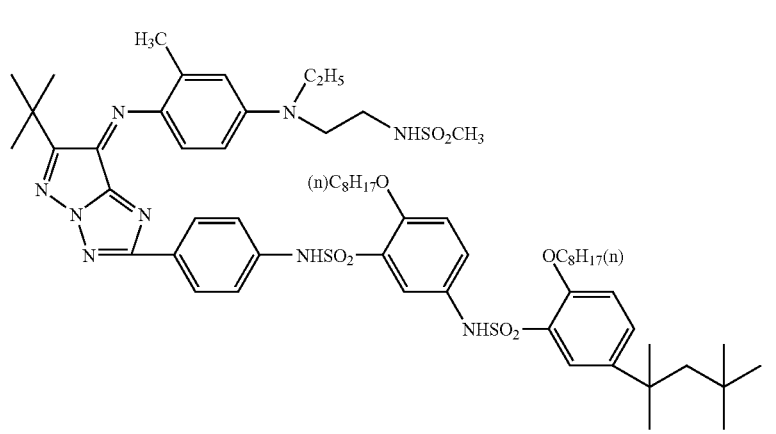
M-6
Examples of the cyan dye include dyes described in JP-A-2002-121414, JP-A-2002-105370, JP-A-2003-3109, and JP-A-2003-26974.
Pyrrolotriazole azomethine compounds represented by Formula(IV-1a) and phthalocyanine compounds represented by Formulae (C-II-1) and (C-II-2) described in JP-A-2002-121414 are preferably used, and C-1, C-101, and C-105 below can be cited as examples.
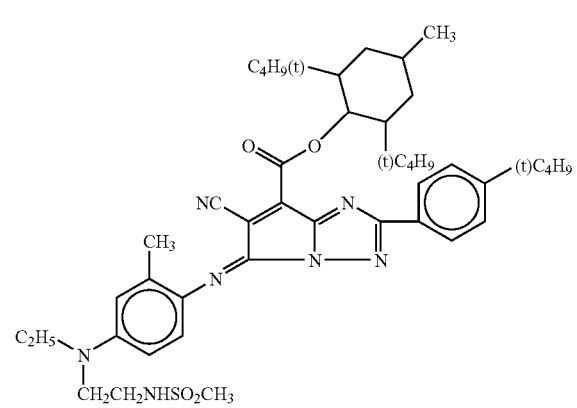
C-1

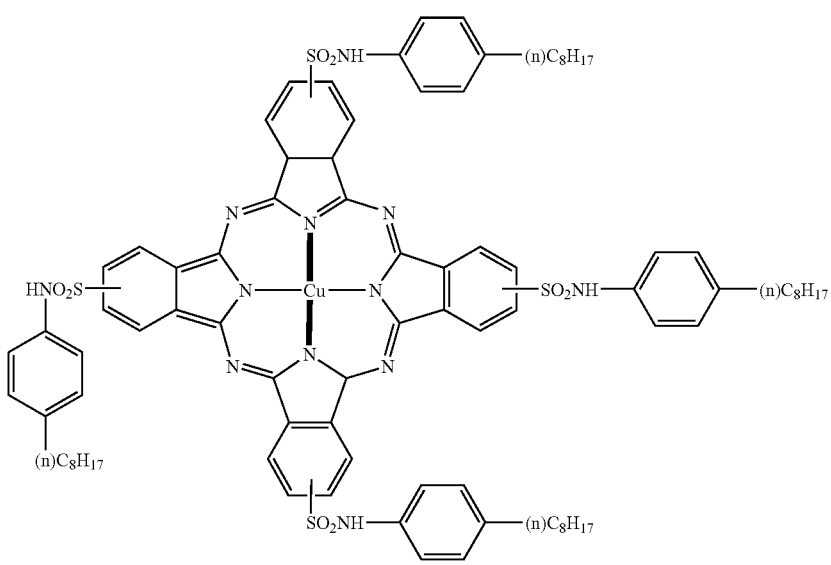
(C-101)

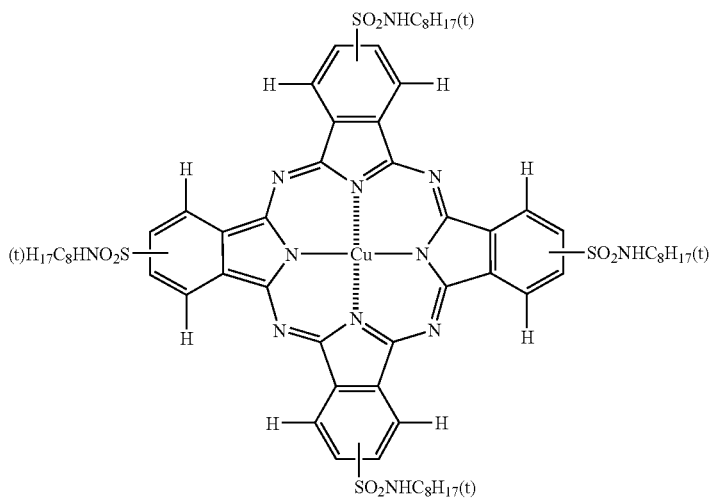
C-105

A black dye can be used as necessary in addition to the three CMY primaries. The black dye can be made by mixing the three CMY dyes.

With regard to dyes other than the above, those generally used in the field of printing technology (for example, printing inks, heat-sensitive inkjet recording, colorants for copying such as electrostatic photography, and color proofing) can be used.

Examples thereof include dyes described in 'Senryo Binran' (Dye handbook) Ed. by The Society of Synthetic Organic Chemistry, Japan, Maruzen Co., Ltd. (1970), 'Kaisetsu Senryokagaku' (Explanation of Dye Chemistry), S. Abeta and K. Imada, Shokusensha Co., Ltd. (1988), 'Shikiso Handobukku' (Colorant Handbook), Ed. by M. Ogawara, Kodansha Ltd. (1986), 'Inkujetto Purinta You Kemikarusu' (Inkjet Printer Chemicals—Survey of Materials Development Trends and Prospects), CMC Publishing Co., Ltd. (1997), 'Inkujetto Purinta' (Inkjet Printers—Technology and Materials), T. Amari, CMC Publishing Co., Ltd. (1998), etc.

(Pigment)

The pigment is not particularly limited, and it is possible to use any generally commercially available organic pigment or inorganic pigment, a dispersion of a pigment in an insoluble resin, etc. as a dispersion medium, a pigment on the surface of which a resin has been grafted, etc. It is also possible to use resin particles colored with a dye, etc.

In the present invention, in order to color the outer surface of a model, a color image is formed on the outline of a cross-sectional shape using the above-mentioned YMC binders, and a white reflection layer is preferably provided directly below this color image. The white reflection layer has a role corresponding to, for example, the background of a color print, and it is preferable to use a binder containing a white pigment (white binder) immediately inside the color image.

Specific examples of the white pigment that can be used include basic lead carbonate ($2PbCO_3Pb(OH)_2$, also known as silver white), zinc oxide (ZnO, also known as zinc white), titanium oxide (TiO$_2$, also known as titanium white), and strontium titanate (SrTiO$_3$, also known as titan strontium white).

Titanium oxide has, compared with other white pigments, a low specific gravity, a high refractive index, and is chemically and physically stable, and therefore has high hiding power and coloring power as a pigment and, furthermore, has excellent durability toward acids, alkalis, and other environments. It is therefore preferable to use titanium oxide as the white pigment. It is of course possible to use another white pigment (which can be any white pigment, in addition to the white pigments cited above) according to the type of powder material and binder component.

In the present invention, it is possible to use CMY pigments instead of the CMY dyes.

Specific examples of the organic pigment and the inorganic pigment include, as those exhibiting a yellow color, monoazo pigments such as CI Pigment Yellow 1 (Fast Yellow G, etc.) and CI Pigment Yellow 74, disazo pigments such as CI Pigment Yellow 12 (Disazo Yellow AA, etc.) and CI Pigment Yellow 17, benzidine-free azo pigments such as CI Pigment Yellow 180, azo lake pigments such as CI Pigment Yellow 100 (Tartrazine Yellow Lake, etc.), condensed azo pigments such as CI Pigment Yellow 95 (Azo Condensation Yellow GR, etc.), acidic dye lake pigments such as CI Pigment Yellow 115 (Quinoline Yellow Lake, etc.), basic dye lake pigments such as CI Pigment Yellow 18 (Thioflavine Lake, etc.), anthraquinone pigments such as Flavanthrone Yellow (Y-24), isoindolinone pigment such as Isoindolinone Yellow 3RLT (Y-110), quinophthalone pigments such as Quinophthalone Yellow (Y-138), isoindoline pigments such as Isoindoline Yellow (Y-139), nitroso pigments such as CI Pigment Yellow 153 (Nickel Nitroso Yellow, etc.), and metal complex azomethine pigments such as CI Pigment Yellow 117 (Copper Azomethine Yellow, etc.).

Examples of pigments exhibiting a magenta color include monoazo pigments such as CI Pigment Red 3 (Toluidine Red, etc.), disazo pigments such as CI Pigment Red 38 (Pyrazolone Red B, etc.), azo lake pigments such as CI Pigment Red 53:1 (Lake Red C, etc.) and CI Pigment Red 57:1 (Brilliant Carmine 6B), condensed azo pigments such as CI Pigment Red 144 (Azo Condensation Red BR, etc.), acidic dye lake pigments such as CI Pigment Red 174 (Phloxine B Lake, etc.), basic dye lake pigments such as CI pigment red 81 (Rhodamine 6G' Lake, etc.), anthraquinone pigments such as CI Pigment Red 177 (Dianthraquinonyl Red, etc.), thioindigo pigments such as CI Pigment Red 88 (Thioindigo Bordeaux, etc.), perinone pigments such as CI Pigment Red 194 (Perinone Red, etc.), perylene pigments such as CI Pigment Red 149 (Perylene Scarlet, etc.), quinacridone pigments such as CI Pigment Red 122 (Quinacridone Magenta, etc.), isoindolinone pigments such as CI Pigment Red 180 (Isoindolinone Red 2BLT, etc.), and alizarin lake pigments such as CI Pigment Red 83 (Madder Lake, etc.).

Examples of pigments exhibiting a cyan color include disazo pigments such as CI Pigment Blue 25 (Dianisidine Blue, etc.), phthalocyanine pigments such as CI Pigment Blue 15 (Phthalocyanine Blue, etc.), acidic dye lake pigments such as CI Pigment Blue 24 (Peacock Blue Lake, etc.), basic dye lake pigments such as CI Pigment Blue 1 (Victoria Pure Blue BO Lake, etc.), anthraquinone pigments such as Cl Pigment Blue 60 (Indanthrone Blue, etc.), and alkali blue pigments such as CI Pigment Blue 18 (Alkali Blue V-5:1).

In addition, processed pigments in which fine pigment particles are dispersed in a rosin ester resin or a vinyl chloride—vinyl acetate resin are commercially available, and they can be used. Specific examples of the commercial processed pigments include Microlith pigments manufactured by Ciba Specialty Chemicals, and preferred examples of the processed pigments include Microlith-T pigments in which the pigments are covered by a rosin ester resin.

(UV Exposure)

With regard to UV exposure for curing the UV-curing binder, a high-pressure mercury lamp, a low-pressure mercury lamp, a Deep UV lamp, a halogen lamp, etc., which are generally used, can be used, and the exposure wavelength is 450 to 250 nm, and preferably 400 to 300 nm. The exposure energy is preferably 500 mJ/cm$^2$ or less, and more preferably 10 to 400 mJ/cm$^2$. UV light can be guided from the UV light source to the surface of a powder material using a UV-transparent optical fiber.

Production equipment for the three-dimensional model of the present invention is now explained.

The production equipment of the present invention comprises an inkjet head for discharging a binder containing an ultraviolet-curing compound as droplets onto a powder material layer formed above a support, a light source for applying light to the binder discharged onto the powder material layer, and control means for adjusting the discharge scaling factor for the binder in the outermost layer of the model so that it is 1.05 to 5.0 times.

The production equipment of the present invention has the control means for adjusting the amount of binder discharged onto the outermost layer of the model so that it is the scaling factor of 1.05 to 5.0 times the amount of binder discharged onto the interior of the model; specifically, the number of times of discharge onto the outline grid points is controlled, and as necessary the equipment is provided with control means for adjusting the amount discharged per unit time. In order to easily adjust the amount of binder discharged onto the outermost layer of the model, means for increasing the number of times of discharge onto the outermost layer may be provided.

It is also possible to further provide the production equipment of the present invention with control means for changing the amount of binder discharged, thereby enabling the amount discharged onto the outermost layer to be finely adjusted.

The production equipment of the present invention is provided with a light source that emits light having a wavelength that matches the light curing sensitivity of the binder discharged from the inkjet heads.

Droplets of the binder discharged from the inkjet head reach the powder material layer and are cured completely by exposure to light from the light source.

EXAMPLES

The present invention is explained below with reference to examples, but the present invention is not limited by these examples.

Materials used in Examples of the present invention are as follows.

(Polymerizable Compound)

1,3-Butanediol dimethacrylate (an in-house-synthesized product)

DPHA (dipentaerythritol hexaacrylate: an in-house-synthesized product)

KAYARAD DPCA60 (caprolactone-modified dipentaerythritol hexaacrylate: manufactured by Nippon Kayaku Co., Ltd.)

HDDA (1,6-hexanediol diacrylate: manufactured by Daicel-UCB Co., Ltd.)

(Polymerization Initiator)

1-Hydroxycyclohexyl phenyl ketone (manufactured by Ciba Specialty Chemicals (Ciba S.C.))

2-Hydroxy-2-methylpropiophenone (manufactured by Ciba S.C.)

(Polymerizable Viscosity-adjusting Compound)

Tolyloxyethyl acrylate (manufactured by The Soken Chemical & Engineering Co., Ltd.)

(Pigment)

Titanium oxide (KRONOS KA-15; particle size 0.4 μm: manufactured by Titan Kogyo Kabushiki Kaisha)

(Powder Material)

Polymethyl methacrylate (CHEMISNOW MX-150; average particle size 1.5 μm: manufactured by The Soken Chemical & Engineering Co., Ltd.)

Polymethyl methacrylate (MBX-15; average particle size 15 μm: manufactured by Sekisui Plastics Co., Ltd.)

Amorphous silica (SEAHOSTAR KE-P50; average particle size 0.5 μm: manufactured by Nippon Shokubai Co., Ltd.)

Polystyrene (CHEMISNOW SX-130H; average particle size 1.3 μm: manufactured by The Soken Chemical & Engineering Co., Ltd.)

Aluminum hydroxide (HIGILITE H43M; average particle size 0.6 μm: manufactured by Showa Denko K.K.)

Magnesium hydroxide (KISUMA 5Q; average particle size 0.83 μm: manufactured by Kyowa Chemical Industry Co., Ltd.)

Aluminum hydroxide (HIGILITE H-10; average particle size 60 μm; manufactured by Showa Denko K.K.)

The average particle size of the powder material was measured using a COULTER MULTISIZER manufactured by Beckman Coulter, Inc. under conditions of a pore diameter of 100 μm.

Example 1

Preparation of UV-curing Binder 'Colorless Binder'

| | |
|---|---|
| Polymerizable compound: 1,3-butanediol dimethacrylate | 10 g |
| Photopolymerization initiator: 2-hydroxy-2-methylpropiophenone | 0.6 g |

The above components were stirred and mixed to give a colorless binder having a viscosity of about 2 mpa·s.

Preparation of UV-curing Binder 'White Binder'

| | |
|---|---|
| Polymerizable compound: DPHA | 10 g |
| Photopolymerization initiator: 2-hydroxy-2-methylpropiophenone | 0.6 g |
| Polymerizable viscosity-adjusting compound: tolyloxyethyl acrylate | 10 g |
| White pigment: titanium oxide | 3 g |

The above components were kneaded using a three roll mill to give a white binder having a viscosity of about 20 mPa·s.

Preparation of UV-curing Binder 'Yellow Binder'

| | |
|---|---|
| Polymerizable compound: DPHA | 10 g |
| Photopolymerization initiator: 1-hydroxycyclohexyl phenyl ketone | 0.5 g |
| Polymerizable viscosity-adjusting compound: tolyloxyethyl acrylate | 10 g |
| Colorant: Y-1 | 0.6 g |

The above Y-1, the M-1 below, and the C-101 below are as described in the 'Detailed Description of the Invention' section.

The above components were stirred and mixed to give a yellow binder having a viscosity of about 15 mPa·s.

Preparation of UV-curing Binder 'Magenta Binder'

| | |
|---|---|
| Polymerizable compound: DPHA | 10 g |
| Photopolymerization initiator: 1-hydroxycyclohexyl phenyl ketone | 0.5 g |
| Polymerizable viscosity-adjusting compound: tolyloxyethyl acrylate | 10 g |
| Colorant: M-1 | 0.8 g |

The above components were stirred and mixed to give a magenta binder having a viscosity of about 15 mPa·s.

Preparation of UV-curing Binder 'Cyan Binder'

| | |
|---|---|
| Polymerizable compound: DPHA | 10 g |
| Photopolymerization initiator: 1-hydroxycyclohexyl phenyl ketone | 0.5 g |
| Polymerizable viscosity-adjusting compound: tolyloxyethyl acrylate | 10 g |
| Colorant: C-101 | 0.8 g |

The above components were stirred and mixed to give a cyan binder having a viscosity of about 15 mPa·s.

Preparation of UV-curing Binder 'Black Binder'

| | |
|---|---|
| Polymerizable compound: DPHA | 10 g |
| Photopolymerization initiator: 1-hydroxycyclohexyl phenyl ketone | 0.5 g |
| Polymerizable viscosity-adjusting compound: tolyloxyethyl acrylate | 10 g |
| Colorants: Y-1 | 0.3 g |
| M-1 | 0.2 g |
| C-101 | 0.4 g |

The above components were stirred and mixed to give a black binder having a viscosity of about 15 mPa·s.

Preparation of Three-dimensional Model

As a powder material, polymethyl methacrylate (CHEMISNOW MX-150; average particle size 1.5 μm) was laid using a rod to give one powder material layer having a thickness of about 100 μm, and the colored binders (yellow, magenta, cyan, and black) and the colorless transparent binder were appropriately discharged via corresponding inkjet discharge nozzles according to the coloration data.

Liquid droplets with standard volumes of 2 nl were discharged by an ink-jet system employing these UV-curing binders as inks at a ratio by volume of the powder material to the binder of 65:35 and a resolution of 600 dpi (dot gap about 42 µm) so as to make dots form a continuous line. Subsequently, a powder material layer having a thickness corresponding to 1 slice pitch was further formed, the binders were supplied so as to match the required cross-sectional shape, and by repeating this a three-dimensional model having a width of 10 cm, a depth of 1 cm, and a height of 4 cm was prepared.

Example 2

Amorphous silica (SEAHOSTAR KE-P50; average particle size 0.5 µm) was used as the powder material, and evaluation was carried out in the same manner as in Example 1.

Example 3

Polystyrene(CHEMISNOW SX-130H; average particle size 1.3 µm) was used as the powder material, and evaluation was carried out in the same manner as in Example 1.

Example 4

Aluminum hydroxide (HIGILITE H43M; average particle size 0.6 µm) was used as the powder material, and evaluation was carried out in the same manner as in Example 1.

Example 5

Magnesium hydroxide (KISUMA 5Q; average particle size 0.83 µm) was used as the powder material, and evaluation was carried out in the same manner as in Example 1.

Comparative Example 1

The same production process as in Example 1 was carried out except that the ratio by volume of the powder material to the binder was changed to 95:5, and an evaluation was carried out.

Comparative Example 2

The same production process as in Example 1 was carried out except that the ratio by volume of the powder material to the binder was changed to 20:80, but no three-dimensional model was obtained.

Comparative Example 3

The same production process as in Example 1 was carried out except that aluminum hydroxide (HIGILITE H-10; average particle size 60 µm) was used as the powder material, and evaluation was carried out.

EVALUATION METHODS

The texture was evaluated by gloss measurement and a sensory evaluation.
(1) Gloss measurement: the surface gloss at an incident angle of 20° was measured using a gloss checker (IG-320 manufactured by Horiba Ltd.)
(2) Coloration: evaluation was carried out visually using the following rankings Good . . . Good
Fair . . . Fairly good
Poor . . . Inadequate The above results are summarized in Table 1 below.

TABLE 1

| No. | Powder material | Average particle size (µm) | Gloss (%) | Coloration |
|---|---|---|---|---|
| Example 1 | Polymethyl methacrylate | 1.5 | 42 | Good |
| Example 2 | Amorphous silica | 0.5 | 30 | Good |
| Example 3 | Polystyrene | 1.3 | 24 | Good |
| Example 4 | Aluminum hydroxide | 0.6 | 35 | Good |
| Example 5 | Magnesium hydroxide | 0.83 | 31 | Good |
| Comp. Ex. 1 | Polymethyl methacrylate | 1.5 | 12 | Poor |
| Comp. Ex. 2 | Polymethyl methacrylate | 1.5 | — | — |
| Comp. Ex. 3 | Aluminum hydroxide | 60 | 6 | Poor |

Example 6

Preparation of UV-curing Binder 'Colorless Binder'

| | |
|---|---|
| Polymerizable compound: KAYARAD DPCA60 | 5.2 g |
| Polymerizable compound: HDDA | 14.8 g |
| Photopolymerization initiator: 2-hydroxy-2-methylpropiophenone | 0.6 g |

The above components were stirred and mixed to give a colorless transparent binder having a viscosity at 25° C. of about 20 mPa·s.

Preparation of UV-curing Binder 'White Binder'

| | |
|---|---|
| Polymerizable compound: KAYARAD DPCA60 | 5.2 g |
| Polymerizable compound: HDDA | 14.8 g |
| Photopolymerization initiator: 2-hydroxy-2-methylpropiophenone | 0.6 g |
| White pigment: titanium oxide | 3 g |

The above components were kneaded using a three roll mill to give a white binder having a viscosity at 250C of about 25 mPa·s.

Preparation of UV-curing Binder 'Yellow Binder'

| | |
|---|---|
| Polymerizable compound: KAYARAD DPCA60 | 5.2 g |
| Polymerizable compound: HDDA | 14.8 g |
| Photopolymerization initiator: 1-hydroxycyclohexyl phenyl ketone | 0.5 g |
| Colorant: Y-1 | 0.8 g |

The above Y-1, the M-6 below, and the C-105 below are as described in the 'Detailed Description of the Invention' section.

The above components were stirred and mixed to give a yellow binder having a viscosity at 25° C. of about 20 mPa·s.

Preparation of UV-curing Binder 'Magenta Binder'

| | |
|---|---|
| Polymerizable compound: KAYARAD DPCA60 | 5.2 g |
| Polymerizable compound: HDDA | 14.8 g |
| Photopolymerization initiator: 1-hydroxycyclohexyl phenyl ketone | 0.5 g |
| Colorant: M-6 | 0.8 g |

The above components were stirred and mixed to give a magenta binder having a viscosity at 25° C. of about 20 mPa·s.

Preparation of UV-curing Binder 'Cyan Binder'

| | |
|---|---|
| Polymerizable compound: KAYARAD DPCA60 | 5.2 g |
| Polymerizable compound: HDDA | 14.8 g |
| Photopolymerization initiator: 1-hydroxycyclohexyl phenyl ketone | 0.5 g |
| Colorant: C-105 | 0.8 g |

The above components were stirred and mixed to give a cyan binder having a viscosity at 25° C. of about 20 mPa·s.

Preparation of UV-curing Binder 'Black Binder'

| | |
|---|---|
| Polymerizable compound: KAYARAD DPCA60 | 5.2 g |
| Polymerizable compound: HDDA | 14.8 g |
| Photopolymerization initiator: 1-hydroxycyclohexyl phenyl ketone | 0.5 g |
| Colorant: Y-1 | 0.3 g |
| M-6 | 0.2 g |
| C-105 | 0.4 g |

The above components were stirred and mixed to give a black binder having a viscosity at 25° C. of about 20 mPa·s.

Preparation of Three-dimensional Model

As a powder material, polymethyl methacrylate (MBX-15; average particle size 15 μm) was laid using a rod to give one powder material layer having a thickness of about 100 μm, and the colored binders (yellow, magenta, cyan, and black), the white binder, and the colorless transparent binder were appropriately discharged via corresponding inkjet discharge nozzles according to the coloration data.

Liquid droplets were discharged by an inkjet system employing these UV-curing binders as inks at a resolution of 600 dpi (dot gap about 42 μm) so as to make dots form a continuous line. Subsequently, a powder material layer having a thickness corresponding to 1 slice pitch was further formed, the binders were supplied so as to match the required cross-sectional shape, and by repeating this a three-dimensional model was prepared, and it was evaluated.

The amount of binder discharged onto the outermost layer (the lowermost layer, the uppermost layer, and outline grid points of cross-sectional shapes of the middle layers) was 3.0 times the amount of binder discharged onto the interior of the model.

Example 7

A three-dimensional model was prepared and evaluated in the same manner as in Example 6 except that the amount of binder discharged onto the outermost layer was 2.0 times the amount of binder discharged onto the interior of the model.

Example 8

A three-dimensional model was prepared and evaluated in the same manner as in Example 6 except that the amount of binder discharged onto the outermost layer was 1.5 times the amount of binder discharged onto the interior of the model.

Comparative Example 4

A three-dimensional model was prepared and evaluated in the same manner as in Example 6 except that the amount of binder discharged onto the outermost layer was 1.0 times the amount of binder discharged

EVALUATION METHODS (1) Surface Gloss

The surface gloss was measured at an incident angle of 20° using a UGV-6P Digital Variable Angle Gloss Meter.

(2) Texture

A sensory evaluation of the smoothness of the surface of the three-dimensional model obtained was carried out visually and by the feel when touching by hand; this was defined as a texture index and categorized using the following rankings.

Good . . . Good
Fair . . . Fairly good
Poor . . . Inadequate

The above results are summarized in Table 2 below.

TABLE 2

| No. | Amount of binder discharged onto outermost layer | Surface gloss | Texture |
|---|---|---|---|
| Example 6 | 3.0 times | 68% | Good |
| Example 7 | 2.0 times | 49% | Good |
| Example 8 | 1.5 times | 32% | Good |
| Comp. Ex. 4 | 1.0 times | 18% | Fair |

What is claimed is:

1. A process for producing a three-dimensional model, the process comprising:
   a step (layer formation step) of forming above a support a layer of a powder material, the layer having a predetermined thickness;
   a step (cross-sectional shape formation step) of imagewise bonding the powder material layer by a binder according to the cross-sectional shape of a modeled object;
   sequentially repeating the above steps;
   wherein the powder material has an average particle size of 30 μm or less;
   wherein the powder material: binder ratio by volume of the powder material to all binders is 90:10 to 25:75;
   wherein, in the cross-sectional shape formation step, the binder comprises an ultraviolet-curing compound and a region to which the binder has been applied is cured by exposure to ultraviolet rays;

wherein the amount of binder applied onto the outermost layer of the model is 1.05 to 5.0 times the amount of binder applied onto the interior of the model; and the surface gloss of the three-dimensional model obtained when measured at 20° being 20% or more.

2. The process for producing a three-dimensional model according to claim 1, wherein the amount of binder applied onto the outermost layer of the model is 1.05 to 3.0 times the amount of binder applied onto the interior of the model.

3. The process for producing a three-dimensional model according to claim 1, wherein the binder comprises two or more types of binders selected from the group consisting of at least one colored binder, a white colored binder, and a colorless binder.

4. The process for producing a three-dimensional model according to claim 3, wherein the colored binder comprises at least two binders selected from the group consisting of a yellow binder, a magenta binder, a cyan binder, and a black binder.

5. The process for producing a three-dimensional model according to claim 1, wherein the binder comprises a compound having at least one ethylenically unsaturated double bond as the ultraviolet-curing compound.

6. The process for producing a three-dimensional model according to claim 1, wherein the powder material:binder ratio by volume of the powder material to all binders is 80:20 to 50:50.

7. The process for producing a three-dimensional model according to claim 1, wherein the powder material has an average particle size of 1 to 30 μm or less.

8. The process for producing a three-dimensional model according to claim 1, wherein the amount of binder applied onto the outermost layer of the model is 1.05 to 2.5 times the amount of binder applied onto the interior of the model.

9. The process for producing a three-dimensional model according to claim 1, wherein the refractive index $n_1$ of the powder material is in the range of 1.4 to 1.7.

10. The process for producing a three-dimensional model according to claim 1, wherein the binder comprises a photopolymerization initiator and at least one type of polymerizable compound.

11. The process for producing a three-dimensional model according to claim 1, wherein the refractive index difference $(n_1-n_2)$ is less than 0.1 or less, wherein $n_2$ is defined as the refractive index of the bonding agent formed by the polymerization of an ethylenically unsaturated monomer as the binder.

* * * * *